(12) United States Patent
Alicherry et al.

(10) Patent No.: US 7,099,670 B2
(45) Date of Patent: Aug. 29, 2006

(54) METHOD AND APPARATUS FOR DESIGN OF WIRELESS NETWORKS TO AID IN LOCATION IDENTIFICATION OF MOBILE UNITS

(75) Inventors: Mansoor Ali Khan Alicherry, Scotch Plains, NJ (US); Harsha Nagesh, New Providence, NJ (US); Chitra Phadke, Basking Ridge, NJ (US); Viswanath Poosala, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 526 days.

(21) Appl. No.: 10/463,284

(22) Filed: Jun. 17, 2003

(65) Prior Publication Data

US 2004/0259522 A1    Dec. 23, 2004

(51) Int. Cl.
*H04Q 7/20* (2006.01)
(52) U.S. Cl. ............... 455/446; 455/429; 455/443; 455/452.2; 455/453; 455/67.11
(58) Field of Classification Search ............ 455/446, 455/429, 443, 452.2, 453, 67.11
See application file for complete search history.

(56) References Cited

U.S. PATENT DOCUMENTS 5,465,390 A * 11/1995 Cohen .................. 455/446
6,094,580 A * 7/2000 Yu et al. ................ 455/446
6,199,032 B1 * 3/2001 Anderson ............... 703/21
6,519,452 B1 * 2/2003 Agostino et al. ......... 455/423
6,771,966 B1 * 8/2004 Chow ................... 455/446
6,836,467 B1 * 12/2004 Stanley ................. 370/254
6,985,839 B1 * 1/2006 Motamedi et al. ........ 703/6
2002/0006799 A1 * 1/2002 Rappaport et al. ....... 455/446

* cited by examiner

*Primary Examiner*—Matthew Anderson
*Assistant Examiner*—Minh Dao (57) ABSTRACT

Techniques and systems for designing a network providing communication and location identification services are described. A solution point comprising parameters for each of a plurality of base stations is generated. A coverage and locatability performance value for the solution point is computed, as well as derivatives of the performance value. The coverage and locatability performance value and its derivatives are used to indicate favorable directions for searching for subsequent solution points, and subsequent solution points are generated and compared against previous solution points until an optimum solution point is found. The coverage and locatability performance value is a weighted sum of coverage and locatability values for each point in the service area of the network, with coverage values representing forward and reverse link quality and locatability values representing the probability that a point will experience an acceptable power level from at least four base stations.

15 Claims, 3 Drawing Sheets

METHOD AND APPARATUS FOR DESIGN OF WIRELESS NETWORKS TO AID IN LOCATION IDENTIFICATION OF MOBILE UNITS

FIELD OF THE INVENTION

The present invention relates generally to improvements in wireless communications. More particularly, the invention relates to advantageous techniques and systems for wireless network design that will provide relatively simple and reliable ways to design networks so that the location of a mobile device communicating with the network can be consistently identified.

BACKGROUND OF THE INVENTION

The use of wireless communication systems is very widespread and continues to increase. As the number of wireless users increases, the likelihood increases that a user will have a wireless device, such as cellular telephone, available when a need arises to make an emergency call such as a 911 call. Landline systems detect a user's location when an emergency call is made. Such detection is easy, because a landline telephone call is made from a fixed location, typically with the telephone number originating the call being associated with the location. Location detection for wireless telephone calls is much more difficult, but is extremely important. For example, it may be critically important to able to identify the location of a user who may be injured or disoriented and in urgent need of assistance, but does not know the location or is unable to communicate it to an operator.

A number of solutions have been considered. One of the simplest solutions would be the use of global positioning system (GPS) technology, because much of the required infrastructure is already in place. A wireless unit equipped with a GPS receiver could easily adapt the information provided by the GPS receiver to provide location information to an emergency call system, provided that the GPS receiver was able to compute the position data.

However, reliance on the GPS system alone to provide location data is problematic in emergencies. A GPS receiver must have a clear view of several satellites in order to obtain a position fix, and the receiver may take several minutes, even with an acceptable view, to obtain the fix. In emergencies, reliability and speed in obtaining location information can be critical. A user's location must be determined as quickly as possible, so that assistance can be provided promptly. Presently proposed standards for location identification for wireless devices contemplate prompt location identification. These standards require a worst case speed for emergency location identification that is significantly faster than the worst case speed accepted by users of GPS systems.

If a network is properly designed, fast and reliable location identification can be accomplished using triangulation of signals received from a number of base stations in different locations. However, a wireless device must be in sight of and in range of at least four base stations in order to consistently accomplish location identification in this manner. Prior art network design concentrates primarily on positioning base stations and configuring the base station antennas so as to maximize coverage and reduce interference. A wireless unit can communicate successfully with a network if it is within sight and range of one base station. Deployment of base stations so that a unit is within range of more than one base station results in an overlap of coverage areas and some increase of interference between base stations. When considered by themselves, these outcomes are undesirable.

Therefore, prior art design of networks does not impose any requirement that a wireless unit will be within range of more than one base station, and the generation of a network design that is suitable for identifying the location of a wireless unit occurs either accidentally or as a result of field tests and adjustments. Traditionally, networks are designed using geographic and user information, with the base station locations being predetermined primarily according to business considerations. The antenna configurations are optimized to maximize coverage, using tools that yield values for antenna azimuth, transmit power and tilt. If it is desired that the network so designed be usable for location determination, actual field tests are then conducted. One or more users move around within the service area, noting the points at which they are able to obtain location information. This data is then used to make adjustments to the antenna configurations to improve location determination capabilities. Further field tests are then conducted, followed by additional adjustments, and so on. Needless to say, this procedure is both complex and costly.

There exists, therefore, a need for systems and techniques for wireless network design that can be implemented at the initial planning stages of a network and that take into account the need to identify the location of a wireless unit making an emergency call and optimize the design of the network so as to allow for identification of the location of a mobile unit without excessive interference and without a need to deploy an excessive number of base stations.

SUMMARY OF THE INVENTION

A network design system according to an aspect of the present invention receives terrain and user information indicating the characteristics of the area over which the network is to be deployed and the probable user traffic demands over the area. The design system employs the terrain and user information, as well as required coverage and locatability performance values, to generate a design for a network that will produce the specified coverage and locatability performance given the terrain and traffic demands. Locatability requirements may include the requirement that no point within the service area provide location accuracy below a specified threshold. Other constraints may include an already existing layout of the base stations in an existing network.

The terrain and user information, the performance requirements and the constraints, including the requirements related to locatability of mobile units, the placement of base stations and other constraints, are used to compute an optimal solution point for the network. Computation of the solution point is typically a nonlinear optimization problem. The solution point provides values for antenna tilt, azimuth and pilot signal power for each base station in the network, so that proper adjustments of these antenna parameters can provide the desired performance for existing base station layouts or for prospective base station layouts that have already been generated by other tools. In some cases, a solution will not be possible given an existing layout of base stations. In that case, notification of a solution failure can be produced and the details of the computation can be examined with a view toward estimating the proper placement of one or more additional base stations. Exact placement of additional base stations may be determined by other tools, and then the new array can be used as an input to the design system in order to provide a solution.

A more complete understanding of the present invention, as well as further features and advantages of the invention, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
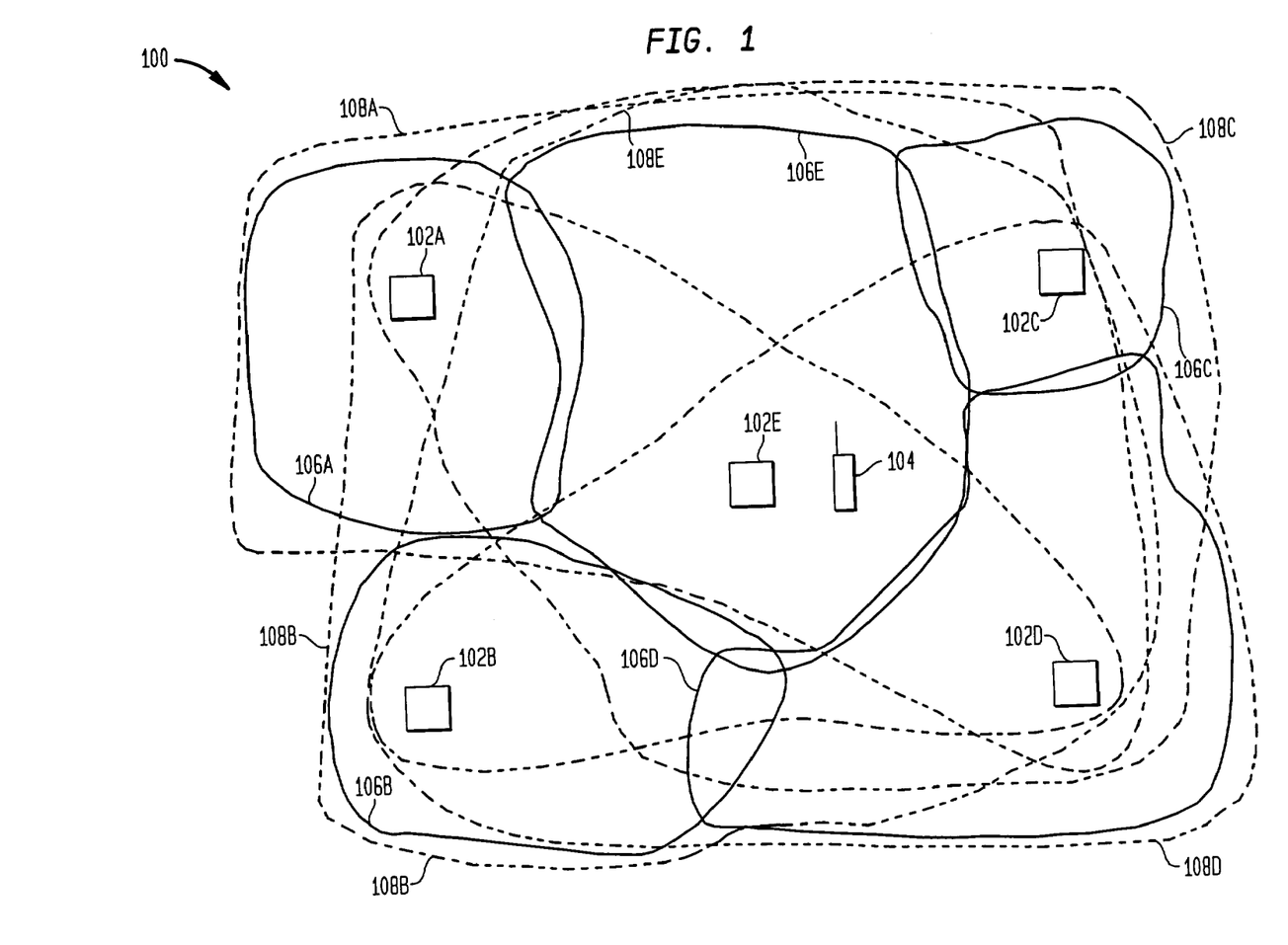
FIG. 1 illustrates a network constructed using the teachings of an aspect of the present invention.

FIG. 1 illustrates a code division multiple access (CDMA) wireless network 100 produced by systems and techniques according to an aspect of the present invention. The network 100 includes a plurality of base stations 102A–102E, and can support a plurality of mobile units, of which the mobile unit 104 is illustrated here. Each of the base stations 102A–102E has a corresponding base station coverage area 106A–106E, respectively. The coverage area 106A–106E for each of the base stations is the area in which the corresponding one of the base stations 102A–102E can support communications. That is, the coverage area is the area within which the forward link power and the reverse link power meet thresholds required for coverage. A measure of the quality of the forward link power is a ratio providing a comparison between the energy per bit of the signal received from the base station and the total interference.

Similarly, a measure of the quality of the reverse link power is a ratio providing a comparison between the energy per bit of the signal received from the mobile unit and the total interference. The forward and reverse link power are measured or estimated at every point, and the points at which the thresholds are met for a particular base station make up the coverage area for that base station.

It is desirable, so much as possible, to prevent the coverage areas of the various base stations from overlapping, in order to avoid interference. Excessive pilot signal power leads to pilot pollution, causing excessive overlap between service areas and reducing the capacity of the system 100. A certain degree of overlap of service areas is needed in order to perform handoff from one base station to another, but this overlap should occur at the edges of the service areas. If excessive overlap between coverage areas is present, the system 100 will not be able to support as many mobile units as would be possible if the overlap were no more than necessary to accomplish handoff. Therefore, the pilot signal power for each of the base stations 102A–102E is preferably managed to avoid overlap of coverage areas.

However, it is highly desirable for a mobile unit such as the mobile unit 104 to be able to detect a pilot signal from more than one base station. The system 100 is therefore designed so that the base stations 102A–102E radiate pilot signals that extend beyond the coverage areas 106A–106E. Beyond the coverage area of a base station, the power of a base station's pilot signal is below the threshold required for communication, but the pilot signal may still have sufficient power to be detectable by a mobile unit. In addition, the reverse link is not required for locatability. Therefore, a mobile unit requires a reverse link with only one base station, in order to allow communication with that base station. Reverse links between a mobile unit and more than one base station are irrelevant or even undesirable.

Therefore, each of the base stations 102A–102E has an associated location coverage area 108A–108E, respectively. The location coverage area for a base station is the area within which a mobile unit can detect the pilot signal of a base station with sufficient strength to use the pilot signal for location identification. The location coverage areas 108A–108E include the coverage areas 106A–106E, but extend beyond the coverage areas 106A–106E. The location coverage areas 108A–108E overlap with one another, preferably in such a way that a mobile unit such as the unit 104 can be within at least four of the location coverage areas 108A–108E at nearly all times.

The network 100 employs the same signal for communication and location identification, but allows overlap by taking advantage of the fact that a lower signal threshold can be used for location than is required for communication. The areas where the threshold is sufficient for location can overlap, even though the areas where the threshold is sufficient for communication do not overlap because these higher threshold areas are smaller. Other network designs are possible, in which the channels used for communication and location are different. An example of such a network is a GSM network, which carries on communication using frequency hopping communication signals typical of GSM communication channels.

Communication coverage area for a base station of such a network is defined by the area within which the communication signal used by the base station meets a required threshold. For location identification, a GSM network can use non frequency hopping broadcast channel signals that are different from and do not interfere or overlap with the communication signals. Location identification for a GSM network is carried out using triangulation of the location signals emitted by several different base stations, and design of such a network may suitably be accomplished using aspects of the systems and techniques of the present invention.

Figure 2:
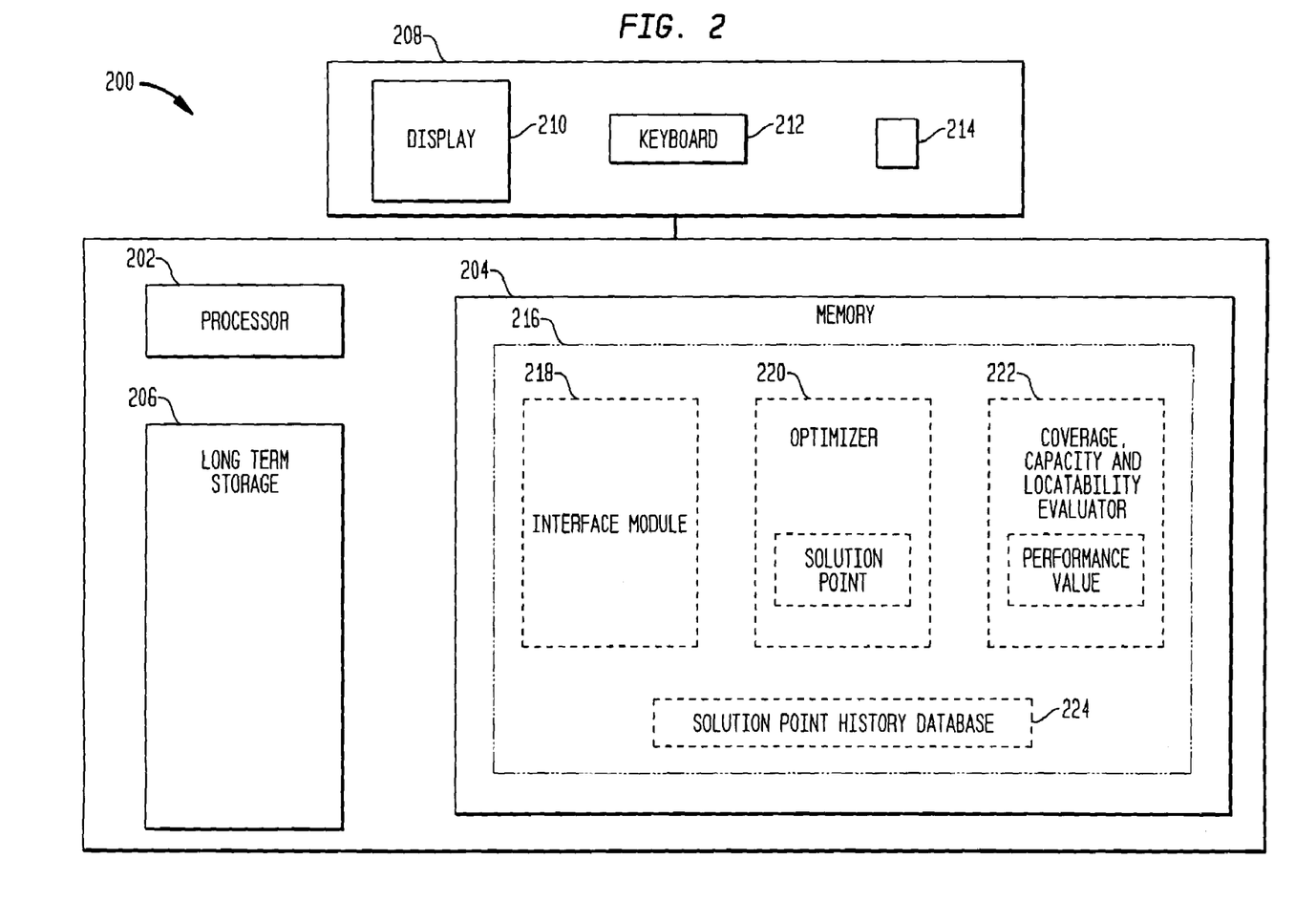
FIG. 2 illustrates a network design system according to an aspect of the present invention.

FIG. 2 illustrates a network design system 200 according to an aspect of the present invention. The system 200 provides a solution to a network design problem, yielding antenna configuration values that will provide satisfactory coverage and capacity, as well as location identification capability. The solution accomplishes a satisfactory resolution of the conflict between coverage for each base station, the capacity of the network, and locatability performance of the network. It is desirable for a base station to have a large service area, but increasing the service area increases the expected traffic within the service area of the base station. The capacity of a base station is limited by the fact that an excessive increase in the number of users served by a base station will lead to an unacceptable probability that the users will block one another's signals. Overall network design seeks to achieve a large coverage area for each base station, while keeping the coverage areas small enough that excessive blocking probabilities do not occur. Excessive coverage for the base stations decreases the overall capacity of the network because the presence of excessive traffic within the larger coverage areas of the base stations leads to higher blocking probabilities.

Locatability requirements add to the blocking probability, because locatability requires that a mobile unit will be within the location coverage area of more than one base station, thereby requiring that each base station will have a large location coverage area, with a expected traffic within the location coverage area being greater than within the coverage area. Design of such a system must balance the desire for coverage and locatability with the desire for capacity, in order to choose a design that will provide coverage and locatability while maintaining an acceptable blocking probability.

The system 200 includes a processor 202, memory 204, long term storage 206 and an input-output interface 208. The input-output interface 208 suitably includes a display 210 and various input devices such as a keyboard 212 and mouse 214. The system 200 hosts a design module 216, suitably implemented as software residing in the memory 204 and executed by the processor 202.

The design module 216 preferably includes an interface module 218, allowing input of information to be used in creating a network design, and output of the design information. The interface module 218 may suitably receive input and produce output in a graphical format, to help enable a user to furnish and receive information in an intuitive way.

The design module 216 also includes an optimizer 220 that explores a solution space to find an optimal solution to a problem. The optimizer 220 receives geographic information as an input. The geographic information consists primarily of the terrain, building density, building heights and other information in the anticipated service area, as well as the expected behavior of the terrain and thus the measured or anticipated strength of the radio signal at selected points. This information may suitably be generated by a geographic information system (GIS), which receives geographically referenced information and formats the information so that it can be easily manipulated and retrieved.

Additional information received as an input by the optimizer 220 may include information such as the location of the base stations, parameters of the antennas of each base station and their sectors. Detailed descriptions of the antennas in each sector are needed for designing the wireless network. Specifically, the radiation pattern of the antennas in every direction and thus rate of path loss are quite important. In addition, the optimizer 220 receives traffic information describing expected user traffic at different points of the service area.

The optimizer 220 generates a solution point that will provide optimal results for the given geographic and traffic information. The solution point comprises values for the power, azimuth angle and tilt angle for each of the base station antennas. Thus, the solution point comprises a set of 3*n values, where n is the number of base station antennas. Wireless network design problems typically require open form solutions, so the problem to be solved by the system 200 is relatively complex. The optimizer 220 undertakes a search for solution points, evaluating each solution point that is considered as a candidate. The search continues until an optimal solution point has been found.

The optimizer suitably identifies a first candidate solution point simply by choosing a solution point that meets a set of common sense constraints. Constraints may include a requirement that no antenna be lying flat on the ground and that the antenna power fall into a reasonable range. The particular initial solution point chosen is only a starting point, so a choice may be made from among a wide range. Alternatively, the optimizer 220 may choose a predetermined standard initial solution point, rather than performing any computation to select the initial solution point.

Once an initial solution point is chosen, a coverage, capacity and locatability engine 222 computes a coverage, capacity and locatability performance value. The coverage, capacity and locatability performance value represents a measurement of the coverage, capacity and locatability performance provided by the solution point. The optimizer 220 then examines the solution space around the solution point by perturbing the antenna parameters defining the solution point. For example, antenna tilt may be adjusted for a set of base stations, azimuth angle may be adjusted for the same or different base stations, and so on. The directions in which the adjustments are made are determined by taking the derivative of the performance value and examining the behavior of the derivative to select favorable directions for adjustment. An adjustment is made in a direction that appears favorable and a new candidate solution point is generated by making adjustments in that direction. The new solution point is then evaluated by the coverage, capacity and locatability engine 222 and compared with the previous solution point. If the new solution point is unfavorable, it is discarded and the optimizer 220 adjusts its searching strategy to disfavor the direction of search that produced the candidate solution point.

In order to determine whether or not new candidate solution points represent performance improvements, and to evaluate the extent of any improvements, the optimizer 220 preferably maintains a solution point database 224. The solution point database 224 suitably includes the sequence of candidate solution points that have been generated, along with the performance value associated with each solution point. Discarded solution points may appear in the database 224, accompanied by a notation that they have been discarded. The solution point database 224 may be examined as desired to evaluate the results of the search, for example whether improvements have occurred during the last several search cycles and the rate of improvement between successive search cycles.

The search and evaluation continues until predetermined criteria are met. One suitable criterion may simply be the achievement of acceptable coverage and locatability values. Alternatively, the criterion to be met may be an optimal solution. An optimal solution may be determined to have been achieved when further improvements are not achieved over several search cycles, or when the rate of improvement is determined to be insufficient to justify further computation.

The time taken for the optimization process is highly dependent on the size of the problem. If the number of variables is higher, computation is more complex and also offers greater potential for improvement in the solution. A number of different strategies could be adopted to terminate the optimization process. One possible technique would simply depend on a user to decide when to terminate the optimization. The optimizer 220 could be set to run indefinitely, computing successive solution points and plotting them graphically using the interface 208. As a promising solution was presented, the user could select the solution point and investigate it to find more details about it. Upon discovering a satisfactory solution point, the user could simply direct the termination of the optimization process.

Another possibility is the termination of optimization if the percentage improvement over a predetermined number of cycles is less than a predetermined value. Typically, for a medium sized optimization problem consisting of about 18 to 21 antennas, the optimization process usually takes a few minutes on a laptop computer, with the optimization process being performed over thousands of cycles.

In order to evaluate the solution points, the design module 216 includes a coverage, capacity and locatability engine 222. Once the optimizer 220 creates a candidate solution point, that point is evaluated by the coverage and locatability engine 222. Once the optimizer produces a candidate solution point, the engine 222 receives the candidate solution point as an input. The engine 222 then evaluates coverage, capacity and locatability information at each point in the service area of the network 100.

In order to compute values for coverage, capacity and locatability, the engine 222 suitably models the service area as a mesh, with traffic being associated with each of the vertices of the mesh. The mesh is generated according to estimates of traffic density throughout the service area, with greater mesh densities in areas of greater anticipated traffic.

In order to compute coverage, the engine 222 computes the quality of the forward link and the reverse link for each mesh point in the service area. This computation is performed by computing the forward link and reverse link power, taking into account the noise in the environment as well as interference from other base stations. Noise and interference computations are managed using appropriate statistical techniques.

In order to compute the signal quality at a location, the power of the signal received from all the antennas to the given location is calculated at several noise levels. This computation takes into account the link independent path loss factors and also the effect of power control algorithms in the network. The coverage metric, representing the probability that the signal to noise ratio is higher than a given threshold, is obtained at each mesh point. The overall network coverage is obtained by summing up these probabilities. The probability value at each mesh point is preferably assigned a suitable weighting. Weightings could, for example, be based on the relative traffic densities at the mesh points.

In order to compute capacity, the power requirement for each antenna is computed to satisfy each mesh point in its service region. Thus, an overall total power requirement for the antenna is found by summing up all the power requirements for all mesh points. The power requirement is translated into the number of equal-powered traffic channels required. The total number of available traffic channels provided by each antenna is known. In a CDMA network such as the network 100 of FIG. 1, this number depends on the number of Walsh codes for a CDMA network. Using these two values as parameters in the Erlang B formula, which is known from trunking theory, yields the call blocking probability for each sector. A sector is a region serviced by an antenna. The overall network blocking rate, B, is found as a weighted sum of the sector blocking rates. A scale factor α, such that α*B gives the target blocking rate of the network design, is computed. The total network capacity can thus given as α* (forward link coverage). That is, the total network capacity can be represented by the product of a and a value providing a measure of the forward link coverage. The value for forward link coverage may be computed using the coverage calculation above.

Locatability is computed in a probabilistic manner, with the locatability value at a particular point being the probability that the point will be in sight of four separate base stations whose forward link pilot signals are greater than a specified minimum threshold. The model used to compute the coverage and locatability values is preferably continuously differentiable with no discontinuities.

Locatability is determined first by determining the probability of satisfaction of the requirement that at least four base stations are visible at each mesh point in the network. Here, visibility is defined as the probability that the forward link pilot signal will be above a given threshold. This is the same as 1 − Probability (less than 4 base stations are visible at the mesh point), and is equal to the sum 1 −

{Pr(no base station is visible) + Pr(exactly 1 base station is visible) +

Pr(exactly 2 base stations are visible) +

Pr(exactly 3 base stations are visible)}.

This is in turn equal to the sum

1 − {Pr(no pilot signal is above the required threshold) +

Pr(exactly one pilot signal is above the required threshold) +

Pr(exactly two pilot signals are above the required threshold) +

Pr(exactly three pilot signals stations are above the required threshold) +

Pr(four or more pilot signals are above the required threshold, but the pilot signals originate from fewer than four base stations)}.

In the above formulas, base stations have been used as they are understood to have the property of not being co-located. However, the optimization problem is posed in terms of antennas and base stations. In a typical wireless network each base station has 3 antennas. In order to reflect the design of an actual wireless network, therefore, the above calculations have to be posed in terms of antennas and the requirement that at least four non co-located antennas be visible must be imposed. That is, the fact that four pilot signals in the forward link are above the given threshold is not enough to guarantee locatability, because two or more of the pilot signals may originate from different antennas on the same base station. Therefore, the above calculations must take into account the probability that various combinations of co-located pilot signals may be received, in order to calculate the probability that a sufficient number of non co-located pilot signals will be received. Therefore, the last term in the above formula can be expanded so that the condition whose probability is determined takes into account the fact that base stations have multiple antennas and that the various combinations of pilot signals received may include co-located signals.

In practice, 3 base stations may be sometimes be used, because for every point in the terrain the altitude is known from the terrain database. Given a point x,y in the terrain, it is possible to obtain a unique value $z=f(x,y)$, where z represents the altitude at the point (x,y). However, this results in two nonlinear equations in x and y that are needed to obtain the location. Such equations may not be easy to solve. In the absence of this formulation of $z=f(x,y)$, the triangulation process calls for a solution of three equations for 3 unknowns and it is possible to obtain an exact closed form solution.

The advantage of this formulation is that one can easily write down the above probability calculations completely as given below:

1 − {Pr(no pilot signal is above the required threshold) +

Pr(exactly one pilot signal is above the required threshold) +

Pr(exactly two pilot signals are above the required threshold) +

Pr(exactly three pilot signals are above the required threshold) +

Pr(case A) + Pr(case B) + Pr(case C)}.

Case A is the case in which exactly four pilot signals are above the required threshold given that there are two disjoint groups of pilot signals, and both of the disjoint pilot signals come from the same base station. Suppose the four pilot signals are a,b,c and d. There are three different ways of dividing these four signals into two groups of two pilot signals each. The possible sets of pilot signals are (ab,cd); (ac,bd);(ad,bc). Here the notation (X,Y) represents the set of pilot signals from base station X and from base station Y. Case A also includes the cases when three out of the four pilot signals are from one base station and the fourth pilot signal is from another base station. These account for 4 additional cases, namely, (a,bcd);(b,acd);(c,abd);(d,abc). The probability of Case A, therefore, is the probability that there are exactly 4 pilot signals are above the given threshold and the pilot signals fall into the categories listed above.

Case B is the case in which exactly 5 pilot signals are above the required threshold in specific combinations defined as follows. If a,b,c,d and e are the 5 visible pilot signals, the required combinations are that there are three pilot signals from one base station and two from another base station. Thus, all variants of such a (3,2) combination must be checked for a co-location condition. In case B, let a,b,c,d and e be the pilot signals above the required threshold. The number of ways in which the five pilot signals can all come from two base stations is ten, and the possible combinations are (abc,de); (abd,ce);(abe,cd); (acd,be); (ace, bd); (ade,bc); (bcd,ae); (bce,ad); (bde,ac); and (cde,ab). The probability of case B is the probability that exactly 5 pilot signals are above the given threshold, and fall into one of the ten specific cases listed above.

Case C is the case in which exactly six pilot signals are above the required threshold in specific combinations defined as follows. Let a,b,c,d,e and f be the six visible pilot signals. The required combinations are that there are three signals from each base station. All variants of such a (3,3) combinations must be checked for co-location conditions. If a,b,c,d,e and f are the six pilot signals above the given threshold, It is necessary to find the ways in which the six pilot signals can all come from two base stations. There are ten such combinations, which are (abc,def); (abd,cef); (abe, cdf); (abf,cde); (acd,bef); (ace,bdf); (acf,bde); (ade,bcf); (adf,bce); and (aef,bcd). The probability of case C is therefore the probability that exactly six pilot signals are above the given threshold and fall into one of the ten specific cases listed above.

For a design problem with n antennas, it is necessary to enumerate all possible combinations of 4, 5 and 6 pilot signals in order to compute the probability of each of the cases A, B and C. Then for each such combination of pilot signals, it is necessary to evaluate the probabilities of the signal combinations described in cases A, B and C. For example, if there are 18 antennas, there are 18-choose-4 possible sets such that each set has exactly four pilot signals. For each such set, it is necessary to perform the probability calculations as given in case A. Similarly, there are 18-choose-5 possible sets such that each set has exactly five pilot signals. For each such set, it is necessary to perform the probability calculations as given in case B. Finally, there are 18-choose-6 possible sets such that each set has exactly six pilot signals. For each such set, it is necessary to perform the probability calculations as given in case C. If seven or more pilot signals are visible in this formulation, then it is guaranteed that any three of them will be non co-located, because each base station has only three antennas.

It will be noted that numerous possible techniques exist of expressing the required probability that at least four non co-located pilot signals are above a given threshold at a mesh point. The present invention is not dependent on the particular mathematical technique used to express the constraints imposed in order to achieve locatability.

Once a measure of locatability at each point has been obtained, a network measure of locatability can be obtained by a weighted sum of the measure of locatability. The weights used could, for example, be related to the traffic at each mesh point.

Once measures for coverage, capacity and locatability are obtained for each mesh point, a coverage and locatability performance value comprising a weighted sum of coverage, locatability and capacity is obtained for the entire network 100. Computation of the coverage and locatability performance value is preferably performed using a function that is continuously differentiable with no discontinuities. The weights used in this combination dictate the relative importance of the parameters being optimized, that is, the coverage, capacity and locatability values for the network. The coverage and locatability performance value is a single scalar number indicating the relative merit of the solution under consideration.

If desired, the coverage, capacity and locatability performance value may include requirements related to location accuracy, for example a requirement that no point in the service area exhibit a location accuracy below a specified threshold. If such a requirement is included, the coverage and locatability engine may model location accuracy for each solution point to be evaluated and may include a suitably weighted value for location accuracy in the coverage and locatability performance value.

An exemplary measure of location accuracy at a given point might be the degree of multipath effects of the signals from the base station to the mobile at that point in the mesh. If the base station is directly in the line of sight, then the multipath effects are minimal. If significant obstacles are present between the mesh point and the base station, then multipath effects are dominant and can be modeled by using the terrain information. Thus the degree of multipath effects from a base station to a mobile unit can be expressed as a number ranging from 0 to 1, with 0 being used when direct line of sight is available.

The coverage, capacity and locatability engine 222 also computes derivatives of the coverage and locatability performance value by perturbing the solution in all three dimensions, in order to determine the behavior of the coverage and locatability performance value around the solution. Computation of the derivatives is made simpler by the fact that, as mentioned above, continuously differentiable functions without discontinuities are preferably used to compute the coverage and locatability performance value. If the formulas used to compute coverage, capacity and locatability allow for closed form expression, direct differentiation can be performed on the formulas. Alternatively, numerical differentiation methods can be used.

Once the coverage, capacity and locatability performance value and its derivatives have been generated, the engine 222 passes these values back to the optimizer 220. The optimizer 220 compares the coverage, capacity and locatability performance value of the solution against previously evaluated solutions. If the solution is significantly worse than the best previously evaluated solution, the solution is discarded. If the solution is better than or reasonably comparable to the best previously evaluated solution, the solution is retained and the solution space around the candidate solution is explored. The point yielding the best coverage and locatability performance value is chosen as the current candidate solution point if it is superior to the last accepted candidate solution point. The optimizer 220 continues to explore the solution space until the best solution point is found. The antenna parameters comprising the solution point are then passed to the input output interface 208, to allow their use in a network design.

It will be noted that in some instances an acceptable solution point will not exist. Such cases frequently occur because the system includes an inadequate number of base stations to meet the coverage and locatability requirements. If no solution can be found, a notification of that fact may suitably be provided using the input output interface 208. Additional base stations may be planned or placed, typically using other tools, and a new attempt may be made to generate an acceptable solution point.

Figure 3:
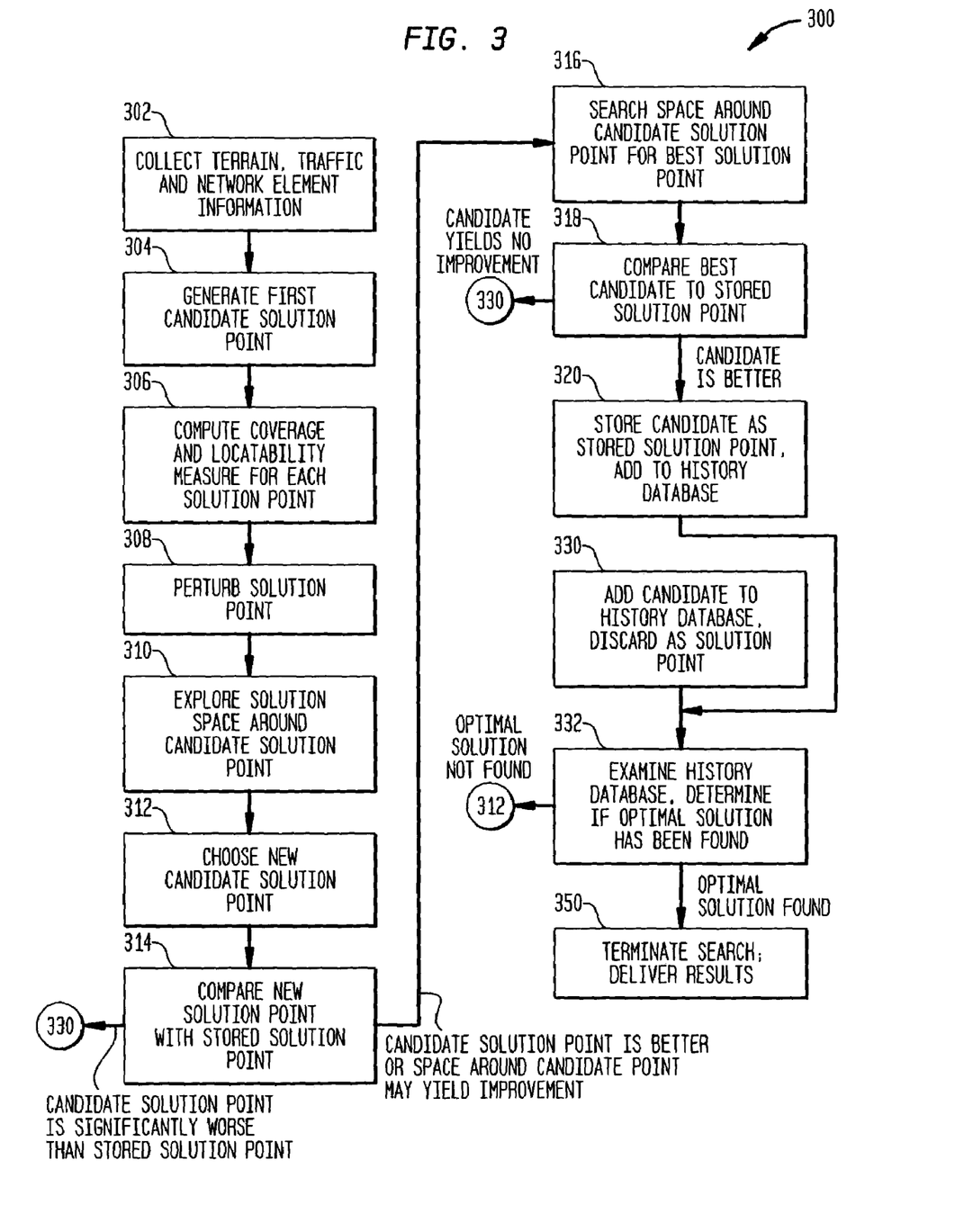
FIG. 3 illustrates a process of network design according to an aspect of the present invention.

FIG. 3 illustrates the steps of a process 300 of network design according to an aspect of the present invention. At step 302, terrain, traffic, and network element information is collected for a planned network. At step 304, a first candidate solution point for the network is generated. The solution point comprises power, tilt angle and azimuth angle values for each base station antenna for the network. At step 306, a weighted coverage, capacity and locatability performance value is computed for the candidate solution point. The coverage, capacity and locatability performance value provides a measurement evaluating the overall coverage, capacity and locatability performance over the service area of the network, and is preferably computed employing a model that is continuously differentiable with no discontinuities. At step 308, the solution point is perturbed in order to explore the behavior of the coverage and locatability performance value in the space around the solution point. At step 310, the solution space around the candidate solution point is explored in order to discover the solution point providing the best value. The solution point yielding the best coverage and localization value is stored.

At step 312, a new candidate solution point is chosen. At step 314, the new candidate solution point is evaluated and compared with the stored solution point. If the new candidate solution point is significantly worse than the stored solution point, the process skips to step 330 and the new candidate solution point is discarded. If the new candidate solution point is better than the stored solution point, or if it appears that the solution space around the candidate solution point may hold a solution point superior to the stored solution point, the process proceeds to step 316 and the solution space around the candidate point is examined in order to determine the best candidate in that range. Typically, even if the candidate solution point yields a performance value that is inferior to that of the stored solution point, exploration of the solution space around the candidate solution point will be worthwhile if the value yielded by the candidate solution point does not fall too far below that yielded by the stored solution point. At step 318, the best candidate is compared to the stored solution point to determine if it provides a better coverage and locatability performance value. If the best candidate provides a better coverage, capacity and locatability performance value, the process proceeds to step 320, otherwise, the process skips to step 330. At step 320, the candidate is stored, becoming the stored solution point and replacing the candidate solution point. The previous solution point is stored in a history database. The process then skips to step 332.

At step 330, the candidate solution point is stored in the history database, but is discarded as a possible solution point. The process then proceeds to step 332.

At step 332, the stored solution point and the history database are examined to determine if an optimal solution point has been found. Whether the solution point is optimal is preferably based on criteria such as whether the coverage and locatability values of the solution point meet predetermined criteria, such as government requirements for locatability, and by examining the history database to determine whether the improvements being achieved are great enough to warrant continued searching. If an optimal solution point has not been found, the process returns to step 312. If an optimal solution point has been found, the process terminates at step 350.

While the present invention has been disclosed in the context of various aspects of presently preferred embodiments, it will be recognized that the invention may be suitably applied to other environments consistent with the claims which follow.

We claim:

1. A system for design of a wireless network providing communication and location services for mobile units within the service area of the network, comprising:

an optimizer for generating solution values for a network design, the optimizer being operative to search for solution points providing optimal communication coverage and location identification performance for the network; and a coverage and locatability engine for evaluating coverage and location performance for each of a series of solution points selected by the optimizer, the coverage and locatability engine computing a coverage and locatability performance value for each of the solution points and providing the performance value to the optimizer for use in evaluating the quality of the solution point, wherein the optimizer searches for candidate solution points by first generating an initial candidate solution point, submitting the initial candidate solution point to the coverage and locatability engine for evaluation and using the results generated by the coverage and locatability engine to evaluate the quality of the solution point and to determine favorable search areas for the next solution point, and repeatedly generating and evaluating new candidate solution points until an optimal solution point is found, wherein the coverage and locatability engine computes derivatives of each coverage and locatability performance value for a solution point and wherein the derivatives are used by the optimizer to indicate favorable directions in which to search for a new candidate solution point.

2. The system of claim 1, wherein the optimizer, upon identifying a candidate solution point, perturbs the parameters of the solution point in order to identify the most favorable solution in the solution space in the vicinity of the candidate solution point.

3. The system of claim 2, wherein the coverage and locatability performance value is a weighted sum of coverage and locatability values for each point within the network.

4. The system of claim 3, wherein the coverage value for each point within the network is based on the quality of the forward and reverse link for the mesh point and wherein the value for locatability for each point within the network is based on the likelihood that the mesh point will experience a forward link of at least a specified minimum power for at least four different base stations in the service area.

5. The system of claim 4, wherein the optimizer receives terrain and traffic information for use in computing the solution points.

6. The system of claim 5, wherein each solution point comprises values for the power, azimuth angle and tilt angle for each base station antenna in the network.

7. The system of claim 6, further including a history database for storing each candidate solution point and details of the computation and evaluation of each candidate solution point, for use in determining whether an optimal solution point has been generated.

8. A method of design for a network providing communication and location identification services for mobile units, comprising the steps of:
   receiving terrain and traffic information for a network:
   sequentially generating a series of solution points for the network:
   evaluating the coverage and locatability performance of each solution point and comparing each subsequently computed solution point with the previously computed solution point to determine if the subsequently computed solution point represents an improvement;
   retaining the subsequently computed solution point if it represents an improvement over the previously computed solution point and discarding the subsequently computed solution point otherwise; and
   continuing to generate and evaluate solution points until an optimal solution point is found, wherein the step of evaluating the coverage and locatability performance of each solution point includes examining the results of the evaluation to identify favorable search directions for use in generating a subsequent solution point.

9. The method of claim 8, wherein the step of evaluating the coverage and locatability performance of each solution point includes computing coverage and locatability values for each point in the service area of the network and computing a weighted sum of the coverage and locatability values in order to generate a coverage and locatability performance value for the solution point.

10. The method of claim 9, wherein the coverage value for each point in the service area includes an evaluation of the forward and reverse link power for the point and wherein the locatability value for each point includes an evaluation of the probability that the point will experience at least a minimum threshold power from at least four base stations.

11. The method of claim 10, wherein each solution point comprises values for power, azimuth angle and tilt angle for each base station antenna in the network.

12. A software program for design of wireless networks providing communication and locatability services and executable by a data processing system, comprising:
   an optimizer module for generating solution values for a network design, the optimizer being operative to search for solution points providing optimal communication coverage and location identification performance for the network; and
   a coverage and locatability module for evaluating coverage and location performance for each of a series of solution points selected by the optimizer, the coverage and locatability engine computing a coverage and locatability performance value for each of the solution points and providing the performance value to the optimizer for use in evaluating the quality of the solution point, wherein the optimizer module searches for candidate solution points by first generating an initial candidate solution point, submitting the initial candidate solution point to the coverage and locatability module for evaluation and using the results generated by the coverage and locatability module to evaluate the quality of the solution point and to determine favorable search areas for the next solution point, and repeatedly generating and evaluating new candidate solution points until an optimal solution point is found, wherein the coverage and locatability module computes derivatives of each coverage and locatability performance value for a solution point and wherein the derivatives are used by the optimizer to indicate favorable directions in which to search for a new candidate solution point.

13. The software program of claim 12, wherein the optimizer module, upon identifying a candidate solution point, perturbs the parameters of the solution point in order to identify the most favorable solution in the solution space in the vicinity of the candidate solution point.

14. The software program of claim 13, wherein the coverage and locatability performance value is a weighted sum of coverage and locatability values for each point within the network.

15. The software program of claim 14, wherein the coverage value for each point within the network is based on the quality of the forward and reverse link for the mesh point and wherein the value for locatability for each point within the network is based on the likelihood that the mesh point will experience a forward link of at least a specified minimum power for at least four different base stations in the service area.

* * * * *